US009444386B2

United States Patent
Knuutila et al.

(10) Patent No.: US 9,444,386 B2
(45) Date of Patent: Sep. 13, 2016

(54) METHOD AND AN APPARATUS FOR CONTROLLING AN ELECTRICAL MACHINE WITH TWO OR MORE MULTIPHASE STATOR WINDINGS

(75) Inventors: Tomi Knuutila, Kuukanniemi (FI); Riku Pöllänen, Lappeenranta (FI); Samuli Kallio, Helsinki (FI); Pasi Peltoniemi, Lappeenranta (FI); Jussi Karttunen, Lappeenranta (FI)

(73) Assignee: THE SWITCH DRIVE SYSTEMS OY, Lappeenranta (FI)

( * ) Notice: Subject to any disclaimer, the term of this patent is extended or adjusted under 35 U.S.C. 154(b) by 114 days.

(21) Appl. No.: 14/403,921

(22) PCT Filed: May 25, 2012

(86) PCT No.: PCT/FI2012/050504
§ 371 (c)(1),
(2), (4) Date: Jan. 29, 2015

(87) PCT Pub. No.: WO2013/175050
PCT Pub. Date: Nov. 28, 2013

(65) Prior Publication Data
US 2015/0229261 A1 Aug. 13, 2015

(51) Int. Cl.
*H02P 21/00* (2016.01)
*H02P 25/22* (2006.01)
*H02P 21/06* (2016.01)

(52) U.S. Cl.
CPC ........... *H02P 25/22* (2013.01); *H02P 21/0003* (2013.01); *H02P 21/06* (2013.01); *H02P 2207/05* (2013.01); *H02P 2207/076* (2013.01)

(58) Field of Classification Search
USPC ......... 318/400.02, 400.03, 400.04, 797, 762, 318/800; 360/79.09; 324/607, 120
See application file for complete search history.

(56) References Cited

U.S. PATENT DOCUMENTS

| 5,763,976 A * | 6/1998 | Huard | H02K 24/00 29/598 |
|---|---|---|---|
| 2010/0123426 A1* | 5/2010 | Nashiki | H02K 1/12 318/701 |
| 2012/0146626 A1* | 6/2012 | Bieler | H02P 6/185 324/207.16 |

FOREIGN PATENT DOCUMENTS

| CN | 101359888 A | 2/2009 |
| EP | 2 020 334 A2 | 2/2009 |

(Continued)

OTHER PUBLICATIONS

Decoupling algorithm in view of multivariable electrical drives control GE44-LARGE (Laboratoire Atlantique de Recherche en GCnie Electrique) CRTT, BP 406, Bd de l'universitt! 44602 Saint-Nazaire Cedex, France, DOC 2002.*

(Continued)

*Primary Examiner* — Jorge L Carrasquillo
(74) *Attorney, Agent, or Firm* — Birch, Stewart, Kolasch & Birch, LLP

(57) ABSTRACT

An apparatus comprises a processing system (201) configured to produce voltage control signals for controlling an electrical machine (202) comprising two or more multiphase stator windings. The processing system is configured to produce the voltage control signals on the basis of rotation-converted stator currents expressed in a coordinate system bound to a rotor of the electrical machine and on the basis of a model of the electrical machine modeling at least inductances of the multiphase stator windings and mutual inductances between the multiphase stator windings. The processing system is configured to convert phase currents of the multiphase stator windings into the rotation-converted stator currents with a conversion rule corresponding to a form of the model of the electrical machine where each of the stator flux-linkages of the model is dependent on only one of the rotation-converted stator currents in spite of the mutual inductances between the multiphase stator windings.

17 Claims, 3 Drawing Sheets

(56) References Cited

FOREIGN PATENT DOCUMENTS

| EP | 2 412 091 B1 | | 6/2014 |
|----|---|---|---|
| JP | 11-262293 A | | 9/1999 |
| JP | 11262293 A | * | 9/1999 |
| JP | 2000-004600 A | | 1/2000 |
| JP | 2000004600 A | * | 1/2000 |
| WO | WO 2012/046115 A1 | | 4/2012 |

OTHER PUBLICATIONS

English language translation of of the Notice of Reasons for Rejection issued in corresponding Japanese Patent Application 2015-513233 on Mar. 22, 2016.

Benkhoris et al., "Decoupling algorithm in view of multivariable electrical drives control", Proceedings of the American Control Conference, XP010597696, May 8, 2002, vol. 6, pp. 4861-4866.

Search report issued in corresponding Chinese Application No. 201280073467.8 on May 30, 2016 (1 page).

* cited by examiner

METHOD AND AN APPARATUS FOR CONTROLLING AN ELECTRICAL MACHINE WITH TWO OR MORE MULTIPHASE STATOR WINDINGS

FIELD OF THE INVENTION

The invention relates generally to rotating electrical machines. More particularly, the invention relates to method for controlling an electrical machine comprising two or more multiphase stator windings. Furthermore, the invention relates to an apparatus and a computer program for the purpose of controlling an electrical machine comprising two or more multiphase stator windings.

BACKGROUND

In many applications, high level of availability of an electrical drive system is required. For example, in electrical ship propulsion the availability is critical from the viewpoint of safety. The availability can be increased by adding redundancy to the electrical drive system. Due to economic reasons, redundancy by multiplying the number of complete electrical drive systems is only rarely possible. However, the redundancy can be achieved by providing an electrical machine with two or more galvanically isolated multiphase stator windings each of which being supplied with its own multiphase power stage. The electrical machine may comprise, for example, two star-connected three-phase stator windings which are shifted relative to each other by e.g. 30 electrical degrees.

Accurate control of an electrical machine is typically based on a model which models the behavior of currents and voltages of the electrical machine and sometimes also the produced torque. In conjunction with a synchronous electrical machine which may have a salient pole rotor, the currents, voltages, and flux linkages are preferably expressed in suitable rotation-converted forms in a coordinate system bound to the rotor in order to avoid position dependency of inductance parameters of the model. The rotation-converted stator currents can be controlled on the basis of differences between the rotation-converted stator currents and their target values. The target values of the rotation-converted stator currents can be formed on the basis of e.g. the desired torque. The rotation-converted stator currents and voltages are typically expressed in the d-q coordinate system whose coordinate axes are along the direct and quadrature axes of the rotor. The inherent advantage of the d-q coordinate system is that the d-component of the stator currents does not generate flux-linkage on the q-direction, and correspondingly the q-component of the stator currents does not generate flux-linkage on the d-direction. This de-coupling between the d- and q-directions significantly facilitates the control of the rotation-converted stator currents because the d- and q-components of the stator currents can be regulated with e.g. separate regulators that can be, for example, proportional-integrating "PI" regulators.

In a case of an electrical machine which comprises two or more multiphase stator windings, the situation is more complicated. The two or more multiphase stator windings have mutual magnetic couplings. Hence, for example the d-directional stator flux-linkage of one of the multiphase stator windings is dependent not only on the d-component of the stator currents of this multiphase stator winding but also on the d-components of the stator currents of the other multiphase stator windings. In a simple control principle, the above-mentioned mutual magnetic couplings are neglected and the two or more multiphase stator windings are controlled separately from each other. However, the neglecting of the above-mentioned mutual magnetic couplings weakens the accuracy of the control. On the other hand, the control gets significantly more complicated if the mutual magnetic couplings are taken into account, because this requires cooperation between regulators related to different multiphase stator windings.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention, there is provided a new method for controlling an electrical machine comprising two or more multiphase stator windings. The method according to the invention comprises:
  converting stator phase currents of the two or more multiphase stator windings into rotation-converted stator currents expressed in a coordinate system bound to a rotor of the electrical machine, and
  controlling power stages connected to the multiphase stator windings on the basis of the rotation-converted stator currents and on the basis of a model of the electrical machine modeling at least inductances of the two or more multiphase stator windings and mutual inductances between the two or more multiphase stator windings, wherein the stator phase currents are converted into the rotation-converted stator currents with a conversion rule corresponding to a form of the model of the electrical machine where each of stator flux-linkages of the model is dependent on only one of the rotation-converted stator currents when inductance parameters of the model are not altered e.g. due to magnetic saturation.

The above-mentioned form of the model in which each of the stator flux-linkages of the model is dependent on only one of the rotation-converted stator currents can be obtained, for example, by diagonalizing the inductance matrix of the traditional d-q model of the electrical machine.

The use of the form where each stator flux-linkage is dependent on only one rotation-converted stator current significantly facilitates the control of the rotation-converted stator currents because the rotation-converted stator currents can be regulated with e.g. separate proportional-integrating "PI" regulators.

In accordance with the second aspect of the invention, there is provided a new apparatus for the purpose of controlling an electrical machine comprising two or more multiphase stator windings. The apparatus according to the invention comprises a processing system configured to:
  produce voltage control signals, which are suitable for controlling the electrical machine, on the basis of rotation-converted stator currents expressed in a coordinate system bound to a rotor of the electrical machine and on the basis of a model of the electrical machine modeling at least inductances of the two or more multiphase stator windings and mutual inductances between the two or more multiphase stator windings, and convert stator phase currents of the two or more multiphase stator windings into the rotation-converted stator currents with a conversion rule corresponding to a form of the model of the electrical machine where each of stator flux-linkages of the model is dependent on only one of the rotation-converted stator currents when inductance parameters of the model are unaltered.

The apparatus may further comprise, for example but not necessarily, power stages for providing supply voltages to the two or more multiphase stator windings on the basis of the voltage control signals.

In accordance with the third aspect of the invention, there is provided a new computer program for the purpose of controlling an electrical machine comprising two or more multiphase stator windings. The computer program according to the invention comprises computer executable instructions for controlling a programmable processor to:

produce voltage control signals, which are suitable for controlling the electrical machine, on the basis of rotation-converted stator currents expressed in a coordinate system bound to a rotor of the electrical machine and on the basis of a model of the electrical machine modeling at least inductances of the two or more multiphase stator windings and mutual inductances between the two or more multiphase stator windings, convert stator phase currents of the two or more multiphase stator windings into the rotation-converted stator currents with a conversion rule corresponding to a form of the model of the electrical machine where each of stator flux-linkages of the model is dependent on only one of the rotation-converted stator currents when inductance parameters of the model are unaltered.

In accordance with the fourth aspect of the invention, there is provided a new computer program product. The computer program product comprises a nonvolatile computer readable medium, e.g. a compact disc "CD", encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF FIGURES

The exemplifying embodiments of the invention and their advantages are explained in greater detail below in the sense of examples and with target to the accompanying drawings, in which.

DESCRIPTION OF EXEMPLIFYING EMBODIMENTS

Figure 1:
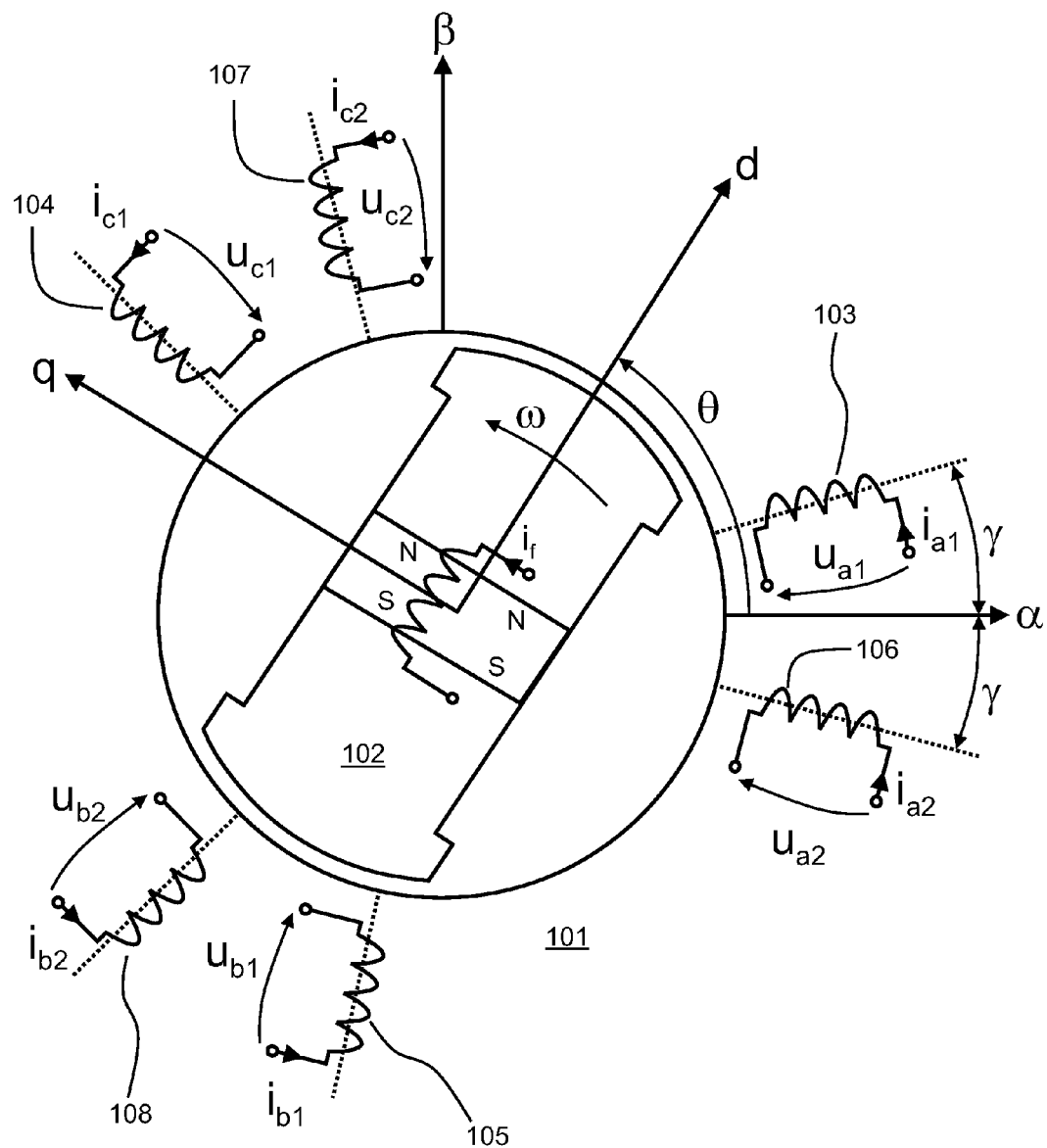
FIG. 1 shows a schematic illustration of an exemplifying electrical machine according to the prior art and comprising two three-phase stator windings.

FIG. 1 shows a schematic illustration of an exemplifying electrical machine comprising two or more multiphase stator windings. In this exemplifying case, the electrical machine is a salient pole synchronous machine which comprises an excitation winding and/or permanent magnet material in its rotor 102. Furthermore, the electrical machine could comprise damper windings in its rotor. In this exemplifying case, a stator 101 of the electrical machine comprises two three-phase stator windings. The first one of the three-phase stator windings comprises stator phase windings 103, 104, and 105. The second one of the three-phase stator windings comprises stator phase windings 106, 107, and 108. The phase currents of the first three-phase stator winding are denoted with $i_{a1}$, $i_{b1}$, and $i_{c1}$, and the phase currents of the second three-phase stator winding are denoted with $i_{a2}$, $i_{b2}$, and $i_{c2}$. The phase voltages of the first three-phase stator winding are denoted with $u_{a1}$, $u_{b1}$, and $u_{c1}$, and the phase voltages of the second three-phase stator winding are denoted with $u_{a2}$, $u_{b2}$, and $u_{c2}$. The first and second three-phase stator windings are shifted relative to each other by an electrical angle of $2\gamma$ as illustrated by FIG. 1.

FIG. 1 presents a d-q coordinate system which is bound to the rotor 102. The d-axis of the d-q coordinate system represents the direct axis of the rotor, and the q-axis of the d-q coordinate system represents the quadrature axis of the rotor as illustrated by FIG. 1. FIG. 1 presents also a $\alpha$-$\beta$ coordinate system which is bound to the stator 101. The rotational position of the rotor with respect to the stator is expressed with an angle $\theta$. The rotational speed $\omega$ of the rotor is the time derivative of $\theta$, i.e. $\omega = d\theta/dt$. The traditional d-q model of the electrical machine is briefly discussed below as a prelude to descriptions of exemplifying embodiments of the invention.

Without limiting generality, we assume for the sake of simplicity that the rotor of the electrical machine is a permanent magnet rotor which does not comprise any excitation and damper windings. In this case, the electrical machine can be modeled with the following voltage equations expressed in the d-q coordinate system:

$$\begin{cases} u_{d1} = R_s i_{d1} + \dfrac{d\Psi_{d1}}{dt} - \omega \Psi_{q1} \\ u_{q1} = R_s i_{q1} + \dfrac{d\Psi_{q1}}{dt} + \omega \Psi_{d1} \\ u_{d2} = R_s i_{d2} + \dfrac{d\Psi_{d2}}{dt} - \omega \Psi_{q2} \\ u_{q2} = R_s i_{q2} + \dfrac{d\Psi_{q2}}{dt} + \omega \Psi_{d2} \end{cases} \quad (1)$$

where $u_{d1}$ and $u_{q1}$ are rotation-converted stator voltages of the first three-phase stator windings expressed in the d-q coordinate system, $u_{d2}$ and $u_{q2}$ are the rotation-converted stator voltages of the second three-phase stator windings expressed in the d-q coordinate system, $i_{d1}$ and $i_{q1}$ are rotation-converted stator currents of the first three-phase stator windings expressed in the d-q coordinate system, $i_{d2}$ and $i_{q2}$ are the rotation-converted stator currents of the second three-phase stator windings expressed in the d-q coordinate system, and $R_s$ is the stator resistance.

$\Psi_{d1}$ and $\Psi_{q1}$ are the d- and q-directional stator flux linkages of the first three-phase stator windings, respectively, and $\Psi_{d2}$ and $\Psi_{q2}$ are the d- and q-directional stator flux linkages of the second three-phase stator windings, respectively. These flux linkages can be modeled with the following equations:

$$\Psi_{d1}=L_d i_{d1}+M_d i_{d2}+\Psi_{PMd},$$

$$\Psi_{q1}=L_q i_{q1}+M_q i_{q2},$$

$$\Psi_{d2}=L_d i_{d2}+M_d i_{d1}+\Psi_{PMd}, \text{ and}$$

$$\Psi_{q2}=L_q i_{q2}+M_q i_{q1}, \quad (2)$$

where $L_d$ is the direct-axis inductance, $M_d$ is the direct-axis mutual inductance between the first and second three-phase stator windings, $L_q$ is the quadrature-axis inductance, $M_q$ is the quadrature-axis mutual inductance between the first and second three-phase stator windings, and $\Psi_{PMd}$ is the d-directional stator flux linkage created by the permanent magnet rotor.

The model of the electrical machine defined by equations (1) and (2) can be presented in the following matrix form:

$$u_{dq} = R_s i_{dq} + L_{dq}\frac{d i_{dq}}{d t} + \omega J L_{dq} i_{dq} + \omega J \Psi_{PMdq}, \quad (3)$$

where:

$$u_{dq} = \begin{bmatrix} u_{d1} \\ u_{q1} \\ u_{d2} \\ u_{q2} \end{bmatrix}, i_{dq} = \begin{bmatrix} i_{d1} \\ i_{q1} \\ i_{d2} \\ i_{q2} \end{bmatrix}, L_{dq} = \begin{bmatrix} L_d & 0 & M_d & 0 \\ 0 & L_q & 0 & M_q \\ M_d & 0 & L_d & 0 \\ 0 & M_q & 0 & L_q \end{bmatrix},$$

$$J = \begin{bmatrix} 0 & -1 & 0 & 0 \\ 1 & 0 & 0 & 0 \\ 0 & 0 & 0 & -1 \\ 0 & 0 & 1 & 0 \end{bmatrix}, \text{ and } \Psi_{PMdq} = \begin{bmatrix} \Psi_{PMd} \\ 0 \\ \Psi_{PMd} \\ 0 \end{bmatrix}.$$

In the above-presented equation (3), vectors are denoted with lower case bold letter and matrices with upper case bold letters. This notation will be used also in other parts of this document.

The vector of the rotation-converted stator voltages $u_{dq}$ can be obtained from the vector of the stator phase voltages $u_{abc}=[u_{a1}, u_{b1}, u_{c1}, u_{a2}, u_{b2}, u_{c2}]^T$ with the following conversion rule:

$$u_{dq}=T_1(\theta)u_{abc}, \quad (4)$$

where $\theta$ is the angle expressing the rotational position of the rotor with respect to the stator as shown in FIG. 1, and $T_1(\theta)$ is a first conversion matrix:

$$T_1(\theta) = \begin{bmatrix} T_p(\delta=\theta-\gamma) & 0 \\ 0 & T_p(\delta=\theta+\gamma) \end{bmatrix}, \quad (5)$$

where the sub-matrices $T_p$ are given by:

$$T_p(\delta) = C_1 \begin{bmatrix} \cos\delta & \cos\left(\delta-\frac{2\pi}{3}\right) & \cos\left(\delta+\frac{2\pi}{3}\right) \\ -\sin\delta & -\sin\left(\delta-\frac{2\pi}{3}\right) & -\sin\left(\delta+\frac{2\pi}{3}\right) \end{bmatrix}, \quad (6)$$

where $C_1$ is a constant scaling coefficient.

The vector of the rotation-converted stator currents $i_{dq}$ can be obtained from the vector of the stator phase currents $i_{abc}=[i_{a1}, i_{b1}, i_{c1}, i_{a2}, i_{b2}, i_{c2}]^T$ with the following conversion rule:

$$i_{dq}=T_1(\theta)i_{abc}.$$

The above-presented description is related to an electrical machine comprising two three-phase stator windings. It is, however, straightforward to generalize the above-presented equations (1)-(6) to a general case where there are N M-phase stator windings. Also in the general case, the voltage equations in the matrix form would be similar to the equation (3) shown above. The inductance matrix would $L_{dq}$ be a 2N×2N matrix, the vector of the rotation-converted stator currents $i_{dq}$ would have 2N elements, and the vector of the rotation-converted stator voltages $u_{dq}$ would have 2N elements.

As can be seen from equations (2), the d- and q-directional stator flux linkages of the first three-phase stator winding $\Psi_{d1}$ and $\Psi_{q1}$ are dependent on also the currents $i_{d2}$ and $i_{q2}$ of the second three-phase stator winding. Correspondingly, the Band q-directional stator flux linkages of the second three-phase stator winding $\Psi_{d2}$ and $\Psi_{q2}$ are dependent on also the currents $i_{d1}$ and $i_{q1}$ of the first three-phase stator winding. This cross-dependency complicates the control of the currents of the electrical machine. In the matrix form equation (3), the cross-dependency is manifested by the non-zero off-diagonal elements of the inductance matrix $L_{dq}$.

In conjunction with embodiments of the present invention, the problem associated with the above-mentioned cross-dependency is avoided by using such form of the model of the electrical machine where each of the stator flux-linkages of the model is dependent on only one of the rotation-converted stator currents in spite of the mutual inductances between the two or more multiphase stator windings when the inductance parameters of the model are not altered e.g. due to magnetic saturation.

The above-mentioned form of the model of the electrical machine can be derived, for example, from the matrix formulation presented by the equation (3).

The inductance matrix $L_{dq}$ is symmetric and thus it can be converted into a diagonal form with the aid of a second conversion matrix $T_2$:

$$L_{DQ}=T_2 L_{dq} T_2^T) \quad (7)$$

where $L_{DQ}$ is the diagonalized inductance matrix, and the second conversion matrix $T_2$ is $[g_1 \ g_2 \ \ldots \ g_n]$ where $g_1 \ g_2 \ \ldots \ g_n$ are the eigenvectors of the inductance matrix $L_{dq}$. For example, in the case where there are two multiphase stator windings, the second conversion matrix $T_2$ can be presented in the form:

$$T_2 = C_2 \begin{bmatrix} 1 & 0 & 1 & 0 \\ 0 & 1 & 0 & 1 \\ 0 & 1 & 0 & -1 \\ -1 & 0 & 1 & 0 \end{bmatrix}, \quad (8)$$

where $C_2$ is a constant scaling coefficient. For example, $C_2=1/\sqrt{2}$ makes the second conversion matrix orthonormal so that $T_2 T_2^T = T_2^T T_2$ is a unit matrix diag(1, 1, 1, 1).

The matrix formulation represented by equation (3) can be multiplied from the left side with the second conversion matrix $T_2$:

$$T_2 u_{dq} = R_s T_2 i_{dq} + T_2 L_{dq} T_2^T \frac{dT_2 i_{dq}}{dt} + \omega T_2 J L_{dq} T_2^T T_2 i_{dq} + \omega T_2 J \Psi_{PMdq}, \quad (9)$$

where the rule that $T_2^T T_2$ is a unit matrix is utilized too.

Equation (9) can be written as:

$$u_{DQ} = R_s i_{DQ} + L_{DQ} \frac{di_{DQ}}{dt} + \omega J_m L_{DQ} i_{DQ} + \omega J_m \Psi_{PMDQ}, \quad (10)$$

where:
- $u_{DQ}$ is a vector of the rotation-converted stator voltages $T_2 u_{dq}$,
- $i_{DQ}$ is a vector of the rotation-converted stator currents $T_2 i_{dq}$,
- $J_m$ is a matrix for which $J_m T_2 = T_2 J$, and
- $\Psi_{PMDQ} = T_2 \Psi_{PMdq}$.

As the inductance matrix $L_{DQ}$ is a diagonal matrix, each of the stator flux-linkages of this form of the model is dependent on only one of the rotation-converted stator currents in spite of the mutual inductances between the two or more multiphase stator windings. In conjunction with a current control, the voltage vector caused by the rotation of the rotor:

$$\omega J_m L_{DQ} I_{DQ} + \omega J_m \Psi_{PMDQ}$$

can be taken into account as a feed-forward term $u_{ff}$ that is superposed to an output of a current regulating device. Removing the above-mentioned feed-forward term from the equation (10) and then solving, in the Laplace domain, for the vector $i_{DQ}$ of the rotation-converted stator currents yields the following system to be controlled with the current regulating device:

$$i_{DQ}(s) = (R_s I + s L_{DQ})^{-1} u_{DQ}(s), \quad (11)$$

where s is the Laplace variable and I is a unit matrix having the same dimensions as the inductance matrix $L_{DQ}$. The vector $i_{DQ}(S)$ of the rotation-converted stator currents represents the quantity to be controlled, and the vector $u_{DQ}(s)$ of the rotation-converted stator voltages represents the quantity with the aid of which the control is carried out. The rows of the equation (11) represent mutually independent first order systems because the inductance matrix $L_{DQ}$ is a diagonal matrix. For example, the $n^{th}$ row of the equation (11) is:

$$i_{DQ,n}(s) = \frac{1}{R_s + s L_{DQ,n}} u_{DQ,n}(s), \quad$$

where $i_{DQ,n}(s)$ is the $n^{th}$ rotation-converted stator current, i.e. the $n^{th}$ element of the vector $i_{DQ}(s)$, $u_{DQ,n}(s)$ is the $n^{th}$ rotation-converted stator voltage, i.e. the $n^{th}$ element of the vector $u_{DQ}(s)$, and $L_{DQ,n}$ is the diagonal element of the $n^{th}$ row, or column, of the inductance matrix $L_{DQ}$.

In an exemplifying case where there are two multiphase stator windings, the inductance matrix $L_{DQ}$ is $$L_{DQ} = \begin{bmatrix} L_{D1} & 0 & 0 & 0 \\ 0 & L_{Q1} & 0 & 0 \\ 0 & 0 & L_{D2} & 0 \\ 0 & 0 & 0 & L_{Q2} \end{bmatrix} = \quad (12a)$$

$$2C_2^2 \begin{bmatrix} L_d + M_d & 0 & 0 & 0 \\ 0 & L_q + M_q & 0 & 0 \\ 0 & 0 & L_q - M_q & 0 \\ 0 & 0 & 0 & L_d - M_d \end{bmatrix},$$

where $C_2$ is the constant scaling coefficient presented in equation (8), and the $u_{DQ}$, $i_{DQ}$, $\Psi_{PMDQ}$ and $J_m$ are:

$$u_{DQ} = \begin{bmatrix} u_{D1} \\ u_{Q1} \\ u_{D2} \\ u_{Q2} \end{bmatrix} = C_2 \begin{bmatrix} u_{d1} + u_{d2} \\ u_{q1} + u_{q2} \\ u_{q1} - u_{q2} \\ u_{d2} - u_{d1} \end{bmatrix}, \quad (12b)$$

$$i_{DQ} = \begin{bmatrix} i_{D1} \\ i_{Q1} \\ i_{D2} \\ i_{Q2} \end{bmatrix} = C_2 \begin{bmatrix} i_{d1} + i_{d2} \\ i_{q1} + i_{q2} \\ i_{q1} - i_{q2} \\ i_{d2} - i_{d1} \end{bmatrix},$$

$$\Psi_{PMDQ} = \begin{bmatrix} \Psi_{PMD1} \\ 0 \\ 0 \\ 0 \end{bmatrix} = \begin{bmatrix} 2C_2 \Psi_{PMd} \\ 0 \\ 0 \\ 0 \end{bmatrix}, \text{ and} \quad (12c)$$

$$J_m = J = \begin{bmatrix} 0 & -1 & 0 & 0 \\ 1 & 0 & 0 & 0 \\ 0 & 0 & 0 & -1 \\ 0 & 0 & 1 & 0 \end{bmatrix}.$$

The equation (10), when written in the component form, yields:

$$\begin{cases} u_{D1} = R_s i_{D1} + \dfrac{d\Psi_{D1}}{dt} - \omega \Psi_{Q1} \\ u_{Q1} = R_s i_{Q1} + \dfrac{d\Psi_{Q1}}{dt} + \omega \Psi_{D1} \\ u_{D2} = R_s i_{D2} + \dfrac{d\Psi_{D2}}{dt} - \omega \Psi_{Q2} \\ u_{Q2} = R_s i_{Q2} + \dfrac{d\Psi_{Q2}}{dt} + \omega \Psi_{D2} \end{cases}, \quad (13)$$

where the flux linkages of the model are:

$$\begin{cases} \Psi_{D1} = L_{D1} i_{D1} + \Psi_{PMD1} \\ \Psi_{Q1} = L_{Q1} i_{Q1} \\ \Psi_{D2} = L_{D2} i_{D2} \\ \Psi_{Q2} = L_{Q2} i_{Q2} \end{cases}. \quad (14)$$

As shown by the equations (14), each of the stator flux-linkages $\Psi_{D1}$, $\Psi_{Q1}$, $\Psi_{D2}$ and $\Psi_{Q2}$ of this form of the model is dependent on only one of the rotation-converted stator currents $i_{D1}$, $i_{Q1}$, $i_{D2}$, and $i_{Q2}$ when the inductance parameters $L_{D1}$, $L_{Q1}$, $L_{D2}$, and $L_{Q2}$ of the model are constant, i.e. unaltered. Magnetic saturation may cause that e.g. the rotation-converted stator current $i_{D2}$ affects the value of e.g. $L_{D1}$ and thus $i_{D2}$ may affect indirectly to $\Psi_{D1}$. However, when the inductance parameters are unaltered, each stator flux linkage is dependent on only one rotation-converted stator current.

The voltages caused by the rotation of the rotor are:

$$\begin{cases} u_{D1,ff} = -\omega L_{Q1} i_{Q1} \\ u_{Q1,ff} = \omega L_{D1} i_{D1} + \omega \Psi_{PMD1} \\ u_{D2,ff} = -\omega L_{Q2} i_{Q2} \\ u_{D2,ff} = \omega L_{D2} i_{D2} \end{cases} \quad (15)$$

Therefore, the mutually independent first order systems to be regulated with a current regulating device are:

$$\begin{cases} i_{D1}(s) = \dfrac{1}{R_s + sL_{D1}} u_{D1}(s) \\ i_{Q1}(s) = \dfrac{1}{R_s + sL_{D1}} u_{Q1}(s) \\ i_{D2}(s) = \dfrac{1}{R_s + sL_{D1}} u_{D2}(s) \\ i_{Q2}(s) = \dfrac{1}{R_s + sL_{D1}} u_{Q2}(s) \end{cases} \quad (16)$$

The rotation-converted stator currents $i_{D1}$, $i_{Q1}$, $i_{D2}$, and $i_{Q2}$ are bound to the stator phase currents $i_{a1}$, $i_{b1}$, $i_{c1}$, $i_{a2}$, $i_{b2}$, and $i_{c2}$ via a third conversion matrix $T_3(\theta)$:

$$i_{DQ} = T_3(\theta) i_{abc} = T_2 T_1(\theta) i_{abc}, \quad (17)$$

$$i_{abc} = T_3^T(\theta) i_{DQ}, \quad (18)$$

where $T_1(\theta)$ is the first conversion matrix defined in equations (5) and (6). Correspondingly, the rotation-converted stator voltages $u_{D1}$, $u_{Q1}$, $u_{D2}$, and $u_{Q2}$ are bound to the stator phase voltages $u_{a1}$, $u_{b1}$, $u_{c1}$, $u_{a2}$, $u_{b2}$, and $u_{c2}$ via the third conversion matrix $T_3(\theta)$:

$$u_{DQ} = T_3(\theta) u_{abc}, \quad (19)$$

An apparatus according to an exemplifying embodiment of the invention comprises:
  means for producing voltage control signals, which are suitable for controlling an electrical machine comprising two or more multiphase stator windings, on the basis of rotation-converted stator currents expressed in a coordinate system bound to a rotor of the electrical machine and on the basis of a model of the electrical machine modeling at least inductances of the two or more multiphase stator windings and mutual inductances between the two or more multiphase stator windings, and
  means for converting stator phase currents of the two or more multiphase stator windings into the rotation-converted stator currents with a conversion rule corresponding to a form of the model of the electrical machine where each of stator flux-linkages of the model is dependent on only one of the rotation-converted stator currents when the inductance parameters of the model are unaltered.

Figure 2:
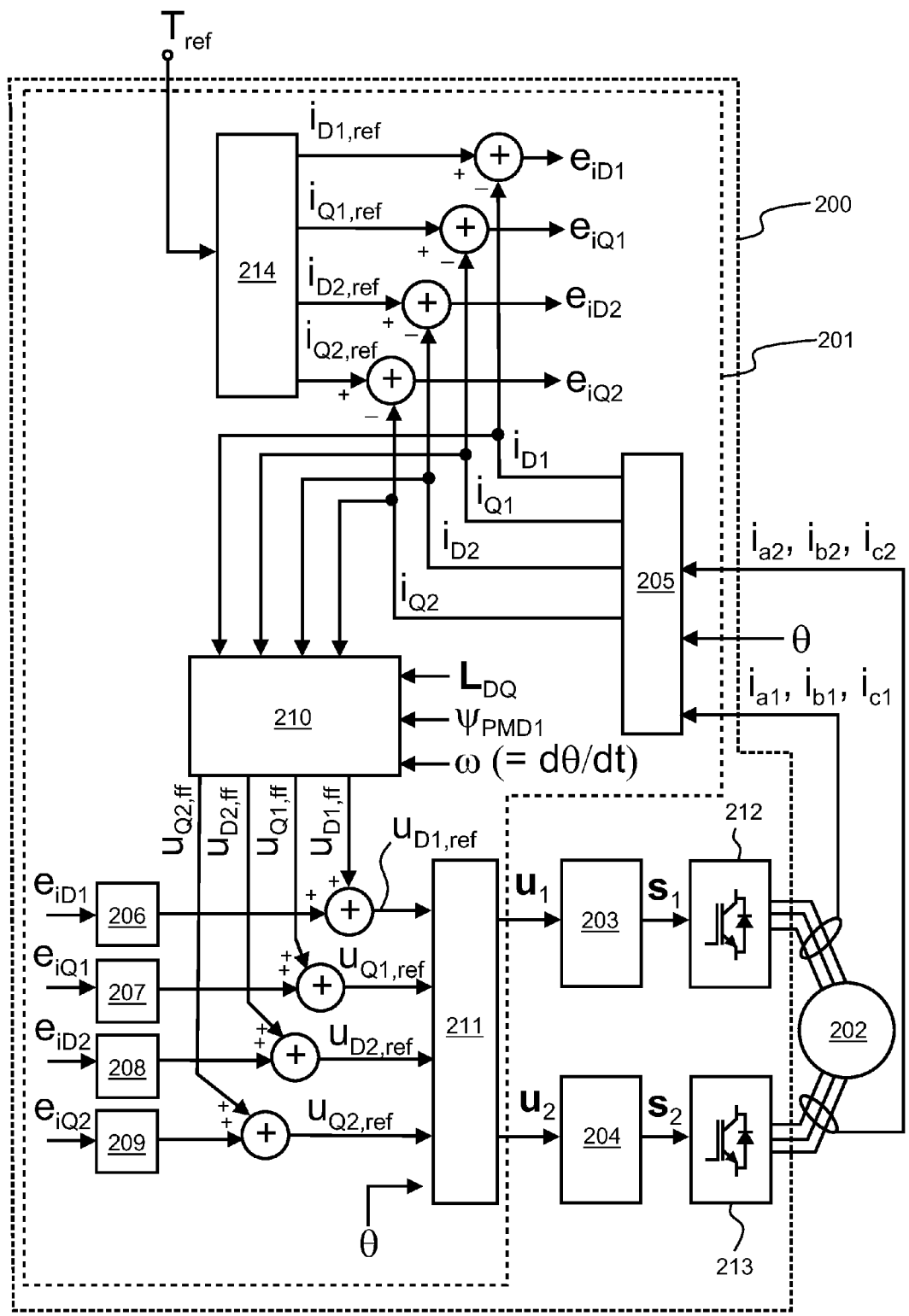
FIG. 2 shows a functional block diagram of an apparatus according to an exemplifying embodiment of the invention for the purpose of controlling an electrical machine comprising two or more multiphase stator windings.

FIG. 2 shows a functional block diagram of an apparatus 200 according to an exemplifying embodiment of the invention for the purpose of controlling an electrical machine 202 comprising two or more multiphase stator windings. In the exemplifying case shown in FIG. 2, the electrical machine comprises two multiphase stator windings that can be e.g. three-phase stator windings. The apparatus comprises a processing system 201 configured to produce voltage control signals $u_1$ and $u_2$ suitable for controlling the electrical machine 202. The apparatus may further comprise modulators 203 and 204 for producing switch-control signals $s_1$ and $s_2$ on the basis of the voltage control signals $u_1$ and $u_2$, and power stages 212 and 213 for producing supply voltages of the stator windings on the basis of the switch-control signals $s_1$ and $s_2$. Alternatively, the apparatus may comprise signal interfaces for connecting to an external system comprising modulators and power stages. The modulators 203 and 204 can be, for example, pulse width modulators "PWM". In this case, the voltage control signals $u_1$ and $u_2$ are arranged to express target values of the phase voltages of the multiphase stator windings. For another example, the modulators 203 and 204 can be space-vector pulse width modulators "SVPWM". In this case, each of the voltage control signals $u_1$ and $u_2$ can be expressed as a vector in the $\alpha$-$\beta$ coordinate system illustrated in FIG. 1.

The processing system 201 is configured to produce the voltage control signals $u_1$ and $u_2$ on the basis of the rotation-converted stator currents $i_{D1}$, $i_{Q1}$, $i_{D2}$, and $i_{Q2}$ which are expressed in a coordinate system bound to a rotor of the electrical machine and on the basis of a model of the electrical machine modeling at least inductances of the two multiphase stator windings and mutual inductances between the two multiphase stator windings. The stator phase currents $i_{a1}$, $i_{b1}$, $i_{c1}$, $i_{a2}$, $i_{b2}$, $i_{c2}$ are converted into the rotation-converted stator currents $i_{D1}$, $i_{Q1}$, $i_{D2}$, and $i_{Q2}$ with a conversion rule corresponding to a form of the model of the electrical machine where each of the stator flux-linkages $\Psi_{D1}$, $\Psi_{Q1}$, $\Psi_{D2}$ and $\Psi_{Q2}$ of the model is dependent on only one of the rotation-converted stator currents $i_{D1}$, $i_{Q1}$, $i_{D2}$, and $i_{Q2}$ when the inductance parameters of the model are unaltered. A conversion rule of the kind mentioned above is presented with equation (17). A functional block 205 shown in FIG. 2 represents the conversion of the stator phase currents into the rotation-converted stator currents.

In the exemplifying embodiment illustrated in FIG. 2, the processing system 201 is configured to direct regulator functions 206, 207, 208, and 209 to differences $e_{iD1}$, $e_{iQ1}$, $e_{iD2}$ and $e_{iQ2}$ between the rotation-converted stator currents and $i_{Q2}$ and their target values $i_{D1,ref}$, $i_{Q1,ref}$, $i_{D2,ref}$ and $i_{Q2,ref}$ as illustrated in FIG. 2. The regulator functions 206-209 can be implemented with, for example, mutually independent proportional-integrating "PI" regulators or with mutually independent proportional-integrating-derivative "PID" regulators. The outputs of the regulator functions 206-209 are superposed with voltages $u_{D1,ff}$, $u_{Q1,ff}$, $u_{D2,ff}$ and $u_{Q2,ff}$ caused by the rotation of the rotor and expressed in the coordinate system bound to the rotor. The voltages $u_{D1,ff}$, $u_{Q1,ff}$, $u_{D2,ff}$, and $u_{Q2,ff}$ are given by the equations (15). A functional block 210 shown in FIG. 2 represents the forming of the voltages $u_{D1,ff}$, $u_{Q1,ff}$, $u_{D2,ff}$, and $u_{Q2,ff}$ on the basis of the rotation-converted stator currents $i_{D1}$, $i_{Q1}$, $i_{D2}$, and $i_{Q2}$, the rotational speed $\omega$ of the rotor, the inductance parameters of the model, and the flux linkage $\Psi_{PMD1}$ generated by the permanent magnet material of the rotor. The outputs of the superposition represent voltage target values $u_{D1,ref}$, $u_{Q1,ref}$, $u_{D2,ref}$, and $u_{Q2,ref}$ which are desired values of the rotation converted stator voltages $u_{D1}$, $u_{Q1}$, $u_{D2}$, and $u_{Q2}$. The processing system 201 is configured to convert the voltage target values $u_{D1,ref}$, $u_{Q1,ref}$, $u_{D2,ref}$ and $u_{Q2,ref}$ into voltage values expressed in a suitable coordinate system bound to the stator of the electrical machine so as to produce the voltage control signals $u_1$ and $u_2$. The voltage target voltages $u_{D1,ref}$, $u_{Q1,ref}$, $u_{D2,ref}$, and $u_{Q2,ref}$ can be converted, for example, into voltage values corresponding to the stator phase voltages with the aid of the equation (20), i.e.

$$[u_1 u_2]^T = C_3 T_3^T(\theta)[u_{D1,ref} u_{Q1,ref} u_{D2,ref} u_{Q2,ref}]^T, \quad (21)$$

where $C_3$ is a constant scaling coefficient, and the voltage control signals $u_1$ and $u_2$ are assumed to be row-vectors of values proportional to the target phase voltages of the two multiphase stator windings. It is also possible to convert the voltage target values $u_{D1,ref}$, $u_{Q1,ref}$, $u_{D2,ref}$, and $u_{Q2,ref}$ into voltage values expressed in the $\alpha$-$\beta$ coordinate system illustrated in FIG. 1. A functional block 211 shown in FIG. 2 represents the conversion of the voltage target values $u_{D1,ref}$, $u_{Q1,ref}$, $u_{D2,ref}$, and $u_{Q2,ref}$ into the voltage values expressed in the coordinate system bound to the stator.

In an apparatus according to an exemplifying embodiment of the invention, the processing system 201 is configured to determine the target values of the rotation-converted stator currents $i_{D1,ref}$, $i_{Q1,ref}$, $i_{D2,ref}$, and $i_{Q2,ref}$ at least partly on the basis of a desired torque $T_{ref}$. By a straightforward analysis it can be shown that the torque $T_e$ produced by the electrical machine can be estimated with the following equation:

$$T_e = C_T p(\Psi_{PMD1} i_{Q1} + (L_{D1} - L_{Q1}) i_{D1} i_{Q1} + (L_{D2} - L_{Q2}) i_{D2} i_{Q2}), \quad (22)$$

where p is the number of pole pairs of the electrical machine and $C_T$ is a constant scaling coefficient.

In the exemplifying case shown in FIG. 2, the electrical machine comprises two multiphase stator windings. In this case, the rotation-converted stator currents $i_{D1}$, $i_{Q1}$, $i_{D2}$, and $i_{Q2}$ are according to the equations (12b):

$$\begin{bmatrix} i_{D1} \\ i_{Q1} \\ i_{D2} \\ i_{Q2} \end{bmatrix} = C_2 \begin{bmatrix} i_{d1} + i_{d2} \\ i_{q1} + i_{q2} \\ i_{q1} - i_{q2} \\ i_{d2} - i_{d1} \end{bmatrix},$$

where $C_2$ is the constant scaling coefficient defined in the equation (8) and $i_{d1}$ is the direct-axis component of a first current space-vector created by the stator phase currents $i_{a1}$, $i_{b1}$, and $i_{c1}$ of the first one of the two multiphase stator windings, $i_{q1}$ is the quadrature-axis component of the first current space-vector, $i_{d2}$ is the direct-axis component of a second current space-vector created by the stator phase currents $i_{a2}$, $i_{b2}$, and $i_{c2}$ of the second one of the two multiphase stator windings, and $i_{q2}$ is a quadrature-axis component of the second current space-vector.

The target values of the rotation-converted stator currents $i_{D2}$ and $i_{Q2}$ are advantageously, but not necessarily, selected to be zeros, i.e. $i_{D2,ref} = i_{Q2,ref} = 0$. This selection is actually an attempt to achieve symmetrical loading between the two multiphase stator windings because $i_{d1} = i_{d2}$ and $i_{q1} = i_{q2}$ when $i_{D2,ref} = i_{Q2,ref} = 0$. In this case, the reference value $i_{Q1,ref}$ can be given as:

$$i_{Q1,ref} = \frac{T_{ref}}{C_T p(\Psi_{PMD1} + (L_{D1} - L_{Q1}) i_{D1,ref})}. \quad (23)$$

The reference value $i_{D1,ref}$ can be selected, for example, so that the overall stator current is minimized and the stator voltage has a desired value. A functional block 214 shown in FIG. 2 represents the determining of the target values of the rotation-converted stator currents $i_{D1,ref}$, $i_{Q1,ref}$, $i_{D2,ref}$, and $i_{Q2,ref}$ at least partly on the basis of the desired torque $T_{ref}$.

In an apparatus according to an exemplifying embodiment of the invention, the processing system 201 is configured to use a measured position angle $\theta$ of the rotor in the conversion of the stator phase currents of the multiphase stator windings into the rotation-converted stator currents.

In an apparatus according to an exemplifying embodiment of the invention, the processing system 201 is configured to estimate the position angle $\theta$ of the rotor on the basis of one or more electrical quantities related to the electrical machine and to use the estimated position angle in the conversion of the stator phase currents of the multiphase stator windings into the rotation-converted stator currents. Methods for estimating the position angle $\theta$ of the rotor can be found, for example, from the following publications: T. Halkosaari: "Speed Sensorless Vector Control of Permanent Magnet Wind Power Generator—The Redundant Drive Concept," in *Wind Power*. InTech, 2010, 558 p., and A. Piippo, M. Hinkkanen, and J. Luomi: "Sensorless Control of PMSM Drives Using a Combination of Voltage Model and HF Signal Injection" In Conference Record of the 39th IEEE-Industry Applications Society (IAS) Annual Meeting, vol 2, pp 964-970, Seattle, Wash., USA.

The processing system 201 can be implemented with one or more processor circuits, each of which can be a programmable processor circuit provided with appropriate software, a dedicated hardware circuit such as, for example, an application specific integrated circuit "ASIC", or a configurable hardware circuit such as, for example, a field programmable gate array "FPGA". For example, some of the functional blocks 205-211, and 214 can be implemented with a dedicated or configurable hardware circuit and some of these functional blocks can be implemented with one or more programmable processor circuits, or all of these functional blocks can be implemented with one or more programmable processor circuits or with dedicated or configurable hardware circuits. The present invention is not limited to any methods of implementation.

Figure 3:
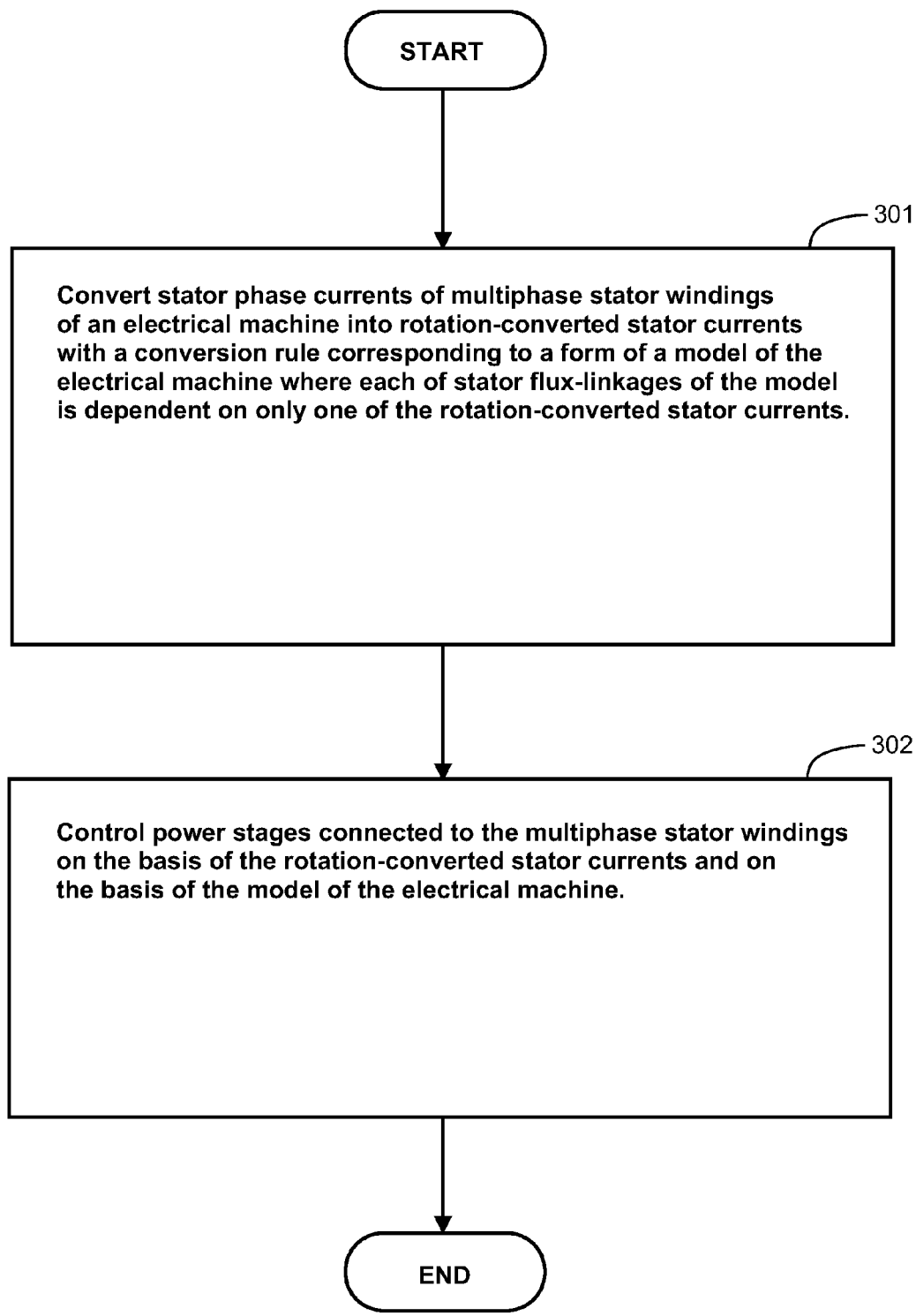
FIG. 3 is a schematic flow diagram of a method according to an exemplifying embodiment of the invention for controlling an electrical machine comprising two or more multiphase stator windings.

FIG. 3 is a schematic flow diagram of a method according to an exemplifying embodiment of the invention for controlling an electrical machine that comprises two or more multiphase stator windings. The method comprises, in a phase 301, converting stator phase currents of the two or more multiphase stator windings into rotation-converted stator currents expressed in a coordinate system bound to a rotor of the electrical machine. The conversion is carried out using a conversion rule that corresponds to a form of the model of the electrical machine where each of stator flux-linkages of the model is dependent on only one of the rotation-converted stator currents in spite of the mutual inductances between the two or more multiphase stator windings when the inductance parameters of the model are unaltered. The method further comprises, in a phase 302, controlling power stages connected to the multiphase stator windings on the basis of the rotation-converted stator currents and on the basis of the model of the electrical machine.

In a method according to an exemplifying embodiment of the invention, the stator phase currents of two multiphase stator windings are converted into four rotation-converted stator currents, and inductance coefficients between the stator flux-linkages and the rotation-converted stator currents are proportional to: $L_d + M_d$, $L_q + M_q$, $L_d - M_d$, and $L_q - M_q$, where $L_d$ is a direct-axis inductance, $M_d$ is a direct-axis mutual inductance between the two multiphase stator windings, $L_q$ is a quadrature-axis inductance, and $M_q$ is a quadrature-axis mutual inductance between the two multiphase stator windings.

In a method according to an exemplifying embodiment of the invention, the four rotation-converted stator currents are proportional to $i_{d1}+i_{d2}$, $i_{q1}+i_{q2}$, $i_{q1}-i_{q2}$, and $i_{d2}-i_{d1}$, respectively, where $i_{d1}$ is the direct-axis component of a first current space-vector created by the stator phase currents of the first one of the two multiphase stator windings, $i_{q1}$ is the quadrature-axis component of the first current space-vector, $i_{d2}$ is the direct-axis component of a second current space-vector created by the stator phase currents of the second one of the two multiphase stator windings, and $i_{q2}$ is the quadrature-axis component of the second current space-vector.

In a method according to an exemplifying embodiment of the invention, the target values of the rotation-converted stator currents which are proportional to $i_{q1}-i_{q2}$ and to $i_{d2}-i_{d1}$ are zeroes so as to achieve symmetrical loading between the two multiphase stator windings.

A method according to an exemplifying embodiment of the invention comprises measuring a position angle of the rotor and using the measured position angle in the conversion of the stator phase currents of the two or more multiphase stator windings into the rotation-converted stator currents.

A method according to an exemplifying embodiment of the invention comprises estimating a position angle of the rotor on the basis of one or more electrical quantities related to the electrical machine and using the estimated position angle in the conversion of the stator phase currents of the two or more multiphase stator windings into the rotation-converted stator currents.

In a method according to an exemplifying embodiment of the invention, the controlling of the power stages comprises:
regulating rotation-converted stator voltages expressed in the coordinate system bound to the rotor on the basis of differences between the rotation-converted stator currents and their target values, and
converting the rotation-converted stator voltages into stator voltages expressed in a coordinate system bound to the stator of the electrical machine.

In a method according to an exemplifying embodiment of the invention, the regulating of the rotation-converted stator voltages comprises:
processing the differences between the rotation-converted stator currents and their target values with a regulator, and
superposing, to outputs of the regulator, voltages caused by rotation of the rotor and expressed in the coordinate system bound to the rotor.

The regulator may comprise, for example, a separate proportional-integrating "PI" or proportional-integrating-derivative "P I D" regulator for each of the differences between the rotation-converted stator currents and their target values.

A method according to an exemplifying embodiment of the invention comprises determining the target values of the rotation-converted stator currents at least partly on the basis of a desired torque.

A computer program according to an exemplifying embodiment of the invention comprises software modules for the purpose of controlling an electrical machine comprising two or more multiphase stator windings. The software modules comprise computer executable instructions for controlling a programmable processor to:
produce voltage control signals, suitable for controlling an electrical machine comprising two or more multiphase stator windings, on the basis of rotation-converted stator currents expressed in a coordinate system bound to a rotor of the electrical machine and on the basis of a model of the electrical machine modeling at least inductances of the two or more multiphase stator windings and mutual inductances between the two or more multiphase stator windings,
convert stator phase currents of the two or more multiphase stator windings into the rotation-converted stator currents with a conversion rule corresponding to a form of the model of the electrical machine where each of stator flux-linkages of the model is dependent on only one of the rotation-converted stator currents when the inductance parameters of the model are unaltered.

The software modules can be e.g. subroutines or functions implemented with a suitable programming language and with a compiler suitable for the programming language and the programmable processor.

A computer program product according to an exemplifying embodiment of the invention comprises a computer readable medium, e.g. a compact disc "CD", encoded with a computer program according to an embodiment of invention.

A signal according to an exemplifying embodiment of the invention is encoded to carry information defining a computer program according to an embodiment of invention.

The specific examples provided in the description given above should not be construed as limiting. Therefore, the invention is not limited merely to the embodiments described above.

What is claimed is:

1. A method for controlling an electrical machine comprising two multiphase stator windings, the method comprising:
controlling power stages connected to the multiphase stator windings on the basis of four rotation-converted stator currents expressed in a coordinate system bound to a rotor of the electrical machine and on the basis of a model of the electrical machine modeling at least inductances of the two multiphase stator windings and mutual inductances between the two multiphase stator windings,
converting stator phase currents of the two multiphase stator windings into the four rotation-converted stator currents with a conversion rule corresponding to a form of the model of the electrical machine where each of stator flux-linkages of the model is dependent on only one of the rotation-converted stator currents when inductance parameters of the model are unaltered, and
obtaining a position angle of the rotor and using the obtained position angle of the rotor in the conversion of the stator phase currents of the two multiphase stator windings into the four rotation-converted stator currents,
wherein inductance coefficients between the stator flux-linkages of the model and the rotation-converted stator currents are proportional to: $L_d+M_d$, $L_q+M_q$, $L_d-M_d$, and $L_q-M_q$, where $L_d$ is a direct-axis inductance, $M_d$ is a direct-axis mutual inductance between the two multiphase stator windings, $L_q$ is a quadrature-axis inductance, and $M_g$ is a quadrature-axis mutual inductance between the two multiphase stator windings.

2. A method according to claim 1, wherein the method comprises measuring a position angle of the rotor and using the measured position angle in the conversion of the stator phase currents of the two multiphase stator windings into the rotation-converted stator currents.

3. A method according to claim 1, wherein the controlling of the power stages comprises regulating rotation-converted stator voltages expressed in the coordinate system bound to the rotor on the basis of differences between the rotation-converted stator currents and their target values, and converting the rotation-converted stator voltages into stator voltages expressed in a coordinate system bound to the stator of the electrical machine.

4. A method according to claim 3, wherein the regulating of the rotation-converted stator voltages comprises processing the differences between the rotation-converted stator currents and their target values with a regulator and superposing, to outputs of the regulator, voltages caused by rotation of the rotor and expressed in the coordinate system bound to the rotor.

5. A method according to claim 4, wherein the regulator comprises a separate proportional-integrating or proportional-integrating-derivative regulator for each of the differences between the rotation-converted stator currents and their target values.

6. A method according to claim 3, wherein the method comprises determining the target values of the rotation-converted stator currents at least partly on the basis of a desired torque.

7. A method according to claim 1, wherein the four rotation-converted stator currents are proportional to $i_{d1}+i_{d2}$, $i_{q1}+i_{q2}$, $i_{q1}-i_{q2}$, and $i_{d2}-i_{d1}$, respectively, where $i_{d1}$ is a direct-axis component of a first current space-vector created by stator phase currents of a first one of the two multiphase stator windings, $i_{q1}$ is a quadrature-axis component of the first current space-vector, $i_{d2}$ is a direct-axis component of a second current space-vector created by stator phase currents of a second one of the two multiphase stator windings, and $i_{q2}$ is a quadrature-axis component of the second current space-vector.

8. A method according to claim 7, wherein the target values of the rotation-converted stator currents which are proportional to $i_{q1}-i_{q2}$ and $i_{d2}-i_{d1}$ are zeroes so as to achieve symmetrical loading between the two multiphase stator windings.

9. An apparatus comprising a processing system configured to:
produce voltage control signals suitable for controlling an electrical machine comprising two multiphase stator windings, the processing system being configured to produce the voltage control signals on the basis of four rotation-converted stator currents expressed in a coordinate system bound to a rotor of the electrical machine and on the basis of a model of the electrical machine modeling at least inductances of the two multiphase stator windings and mutual inductances between the two multiphase stator windings, and
convert stator phase currents of the two multiphase stator windings into the four rotation-converted stator currents with a conversion rule corresponding to a form of the model of the electrical machine where each of stator flux-linkages of the model is dependent on only one of the rotation-converted stator currents when inductance parameters of the model are unaltered, and
said processing system being configured to obtain a position angle of the rotor and to use the obtained position angle of the rotor in the conversion of the stator phase currents of the two multiphase stator windings into the four rotation-converted stator currents,
wherein inductance coefficients between the stator flux-linkages of the model and the rotation-converted stator currents are proportional to: $L_d+M_d$, $L_q+M_q$, $L_d-M_d$, and $L_q-M_q$, where $L_d$ is a direct-axis inductance, $M_d$ is a direct-axis mutual inductance between the two multiphase stator windings, $L_q$ is a quadrature-axis inductance, and $M_q$ is a quadrature-axis mutual inductance between the two multiphase stator windings.

10. An apparatus according to claim 9, wherein the processing system is configured to use a measured position angle of the rotor in the conversion of the stator phase currents of the two multiphase stator windings into the rotation-converted stator currents.

11. An apparatus according to claim 9, wherein the processing system is configured to:
direct regulator functions to differences between the rotation-converted stator currents and their target values,
superpose, to outputs of the regulator functions, voltages caused by rotation of the rotor and expressed in the coordinate system bound to the rotor, the outputs of the superposition representing voltage target values expressed in the coordinate system bound to the rotor, and
convert the voltage target values to a coordinate system bound to the stator of the electrical machine so as to produce the voltage control signals suitable for controlling the electrical machine.

12. An apparatus according to claim 11, wherein the processing system is configured to direct a separate proportional-integrating or proportional-integrating-derivative regulator function to each of the differences between the rotation-converted stator currents and their target values.

13. An apparatus according to claim 11, wherein the processing system is configured to determine the target values of the rotation-converted stator currents at least partly on the basis of a desired torque.

14. An apparatus according to claim 9, wherein the four rotation-converted stator currents are proportional to $i_{d1}+i_{d2}$, $i_{q1}+i_{q2}$, $i_{q1}-i_{q2}$, and $i_{d2}-i_{d1}$, respectively, where $i_{d1}$ is a direct-axis component of a first current space-vector created by stator phase currents of a first one of the two multiphase stator windings, $i_{q1}$ is a quadrature-axis component of the first current space-vector, $i_{d2}$ is a direct-axis component of a second current space-vector created by stator phase currents of a second one of the two multiphase stator windings, and $i_{q2}$ is a quadrature-axis component of the second current space-vector.

15. An apparatus according to claim 14, wherein the processing system is configured to regulate the rotation-converted stator currents which are proportional to $i_{q1}-i_{q2}$ and $i_{d2}-i_{d1}$ to zeros so as to achieve symmetrical loading between the two multiphase stator windings.

16. An apparatus according to claim 9, wherein the apparatus further comprises modulators for producing switch-control signals on the basis of the voltage control signals, and power stages for providing supply voltages to the multiphase stator windings on the basis of the switch-control signals.

17. A non-transitory computer readable medium encoded with a computer program comprising computer executable instructions for controlling a programmable processor to:
produce voltage target values, suitable for controlling an electrical machine comprising two multiphase stator windings, on the basis of four rotation-converted stator currents expressed in a coordinate system bound to a rotor of the electrical machine and on the basis of a model of the electrical machine modeling at least inductances of the two multiphase stator windings and mutual inductances between the two multiphase stator windings, and convert stator phase currents of the two multiphase stator windings into the four rotation-converted stator currents with a conversion rule corresponding to a form of the model of the electrical machine where each of stator flux-linkages of the model is dependent on only one of the rotation-converted stator currents when inductance parameters of the model are unaltered, and obtain a position angle of the rotor and use the obtained position angle of the rotor in the conversion of the stator phase currents of the two multiphase stator windings into the four rotation-converted stator currents, wherein inductance coefficients between the stator flux-linkages of the model and the rotation-converted stator currents are proportional to: $L_d+M_d$, $L_q+M_q$, $L_d-M_d$, and $L_q-M_q$, where $L_d$ is a direct-axis inductance, $M_d$ is a direct-axis mutual inductance between the two multiphase stator windings, $L_q$ is a quadrature-axis inductance, and $M_q$ is a quadrature-axis mutual inductance between the two multiphase stator windings.

* * * * *